United States Patent
Sullivan

[11] 3,862,733
[45] Jan. 28, 1975

[54] LOAD BEARING STAND

[75] Inventor: Haskell A. Sullivan, Hammond, Ind.

[73] Assignee: Sullivan Mfg. & Sales Co., Hammond, Ind.

[22] Filed: May 29, 1973

[21] Appl. No.: 364,897

[52] U.S. Cl. .................................. 248/48, 248/151
[51] Int. Cl. ........................................... A47g 33/12
[58] Field of Search ................. 248/38, 44, 48, 151

[56] References Cited
UNITED STATES PATENTS

| | | | |
|---|---|---|---|
| 2,237,513 | 4/1941 | Timko | 248/44 |
| 2,478,278 | 8/1949 | Kiesow | 248/48 |
| 2,678,992 | 5/1954 | Koch | 248/151 X |
| 2,855,168 | 10/1958 | Vigna | 248/48 |
| 3,026,075 | 3/1962 | Phelon et al. | 248/48 |
| 3,411,740 | 11/1968 | Schulz | 248/151 X |
| 3,480,241 | 11/1969 | Moyer | 248/44 |
| 3,591,114 | 7/1971 | Beatty | 248/48 |
| 3,719,340 | 3/1973 | Norton | 248/48 |

Primary Examiner—William H. Schultz
Attorney, Agent, or Firm—Hill, Gross, Simpson, Van Santen, Steadman, Chiara & Simpson

[57] ABSTRACT

A stand for supporting loads, especially on poles, such as Christmas trees and the like, having a base and a plurality of demountable legs. The legs interlock and cooperate with the base to permit the assembled stand to support relatively great weight. The base may be formed in a single plastic molding operation if desired, as may each leg, and both can be formed with relatively thin material thicknesses which avoids the usual heat distortion problems in plastics fabrication.

24 Claims, 7 Drawing Figures

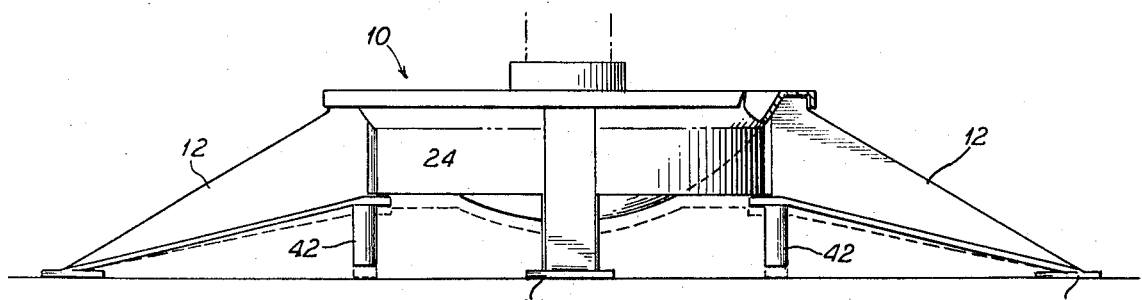
Fig. 4
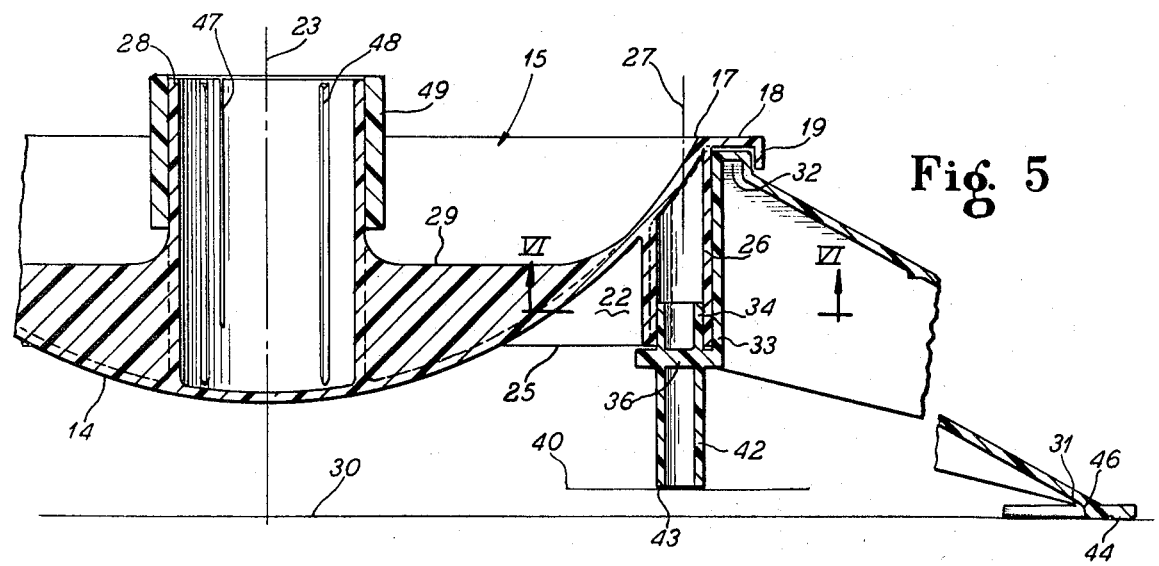
Fig. 5
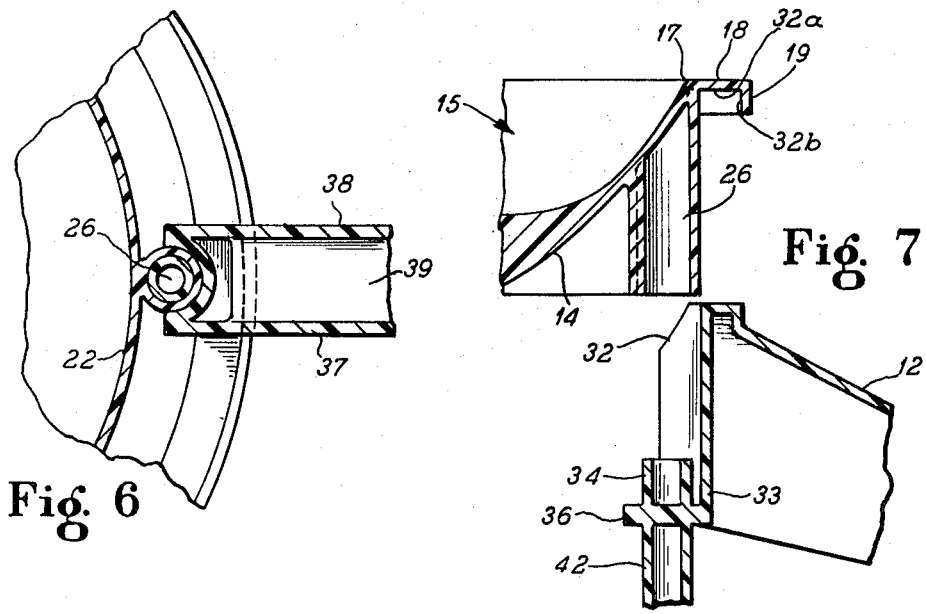
Fig. 6
Fig. 7

LOAD BEARING STAND

BACKGROUND OF THE INVENTION

Load bearing stands especially suitable for Christmas trees and the like have long been known. One of the principle problems in the fabrication of such stands has been that of producing the strongest possible stand, from a load support viewpoint, in the simplest and cheapest manner. Heretofore, stands made using stamped, sheet metal components were particularly common.

More recently, stands fabricated of molded plastic have become commercially significant. As a constructional material, plastic has much different properties from sheet metal, and usually the cheaper plastics have lower strength than, say, sheet steel, but on the other hand, complex shapes can be produced easily, sometimes in a single forming operation, using a plastic.

Plastic stands heretofore have frequently not been strong and frequently have been too expensive for the available markets. The art continues to seek new and improved constructions and techniques adapted for the manufacture of lightweight, strong economical plastic stands.

BRIEF SUMMARY OF THE INVENTION

The present invention is directed to a loading bearing stand which is especially well adapted for Christmas trees and the like and which may, if desired, be fabricated of plastics. The stand of the present invention comprises a base and a plurality of legs demountable thereon.

The base and each leg may be each made as single molded pieces using relatively thin material wall thicknesses which permits one to avoid the usual heat distortion problems associated with plastics fabrication including sink marks, warping, shrinking, etc.

The construction of the base and each leg is such as to provide in an assembled stand such an interlocking and cooperation between elements that the assembled stand is adapted to support an unusual and surprising load in relation to the mass and strength characteristics associated with the more common and more inexpensive moldable plastics, especially thermoplastics, such as polystyrene, polyvinylchloride, polyolefins, methylmethacrylate, and the like, all as those skilled in the art readily appreciate.

The stand provides as optional features various elements, and interrelationships between elements, which permit improved load support and load distribution properties.

Other and further objects, purposes, features, advantages, and utilities will be apparent to those skilled in the art from a reading of the present specification, drawings and claims.

BRIEF DESCRIPTION OF THE DRAWINGS

In the drawings:

FIG. 4 is a side elevational view of the stand of FIG. 1;

FIG. 5 is a vertical sectional view taken along the line V—V of FIG. 2, some parts thereof shown in section and some parts thereof broken away;

FIG. 6 is a fragmentary horizontal view taken along the line VI—VI of FIG. 5, some parts thereof shown in section and some parts thereof broken away; and FIG. 7 is a fragmentary exploded view in vertical section similar to FIG. 5 but showing the manner in which a leg connects with the base.

DETAILED DESCRIPTION

Figures 1, 2, 3:
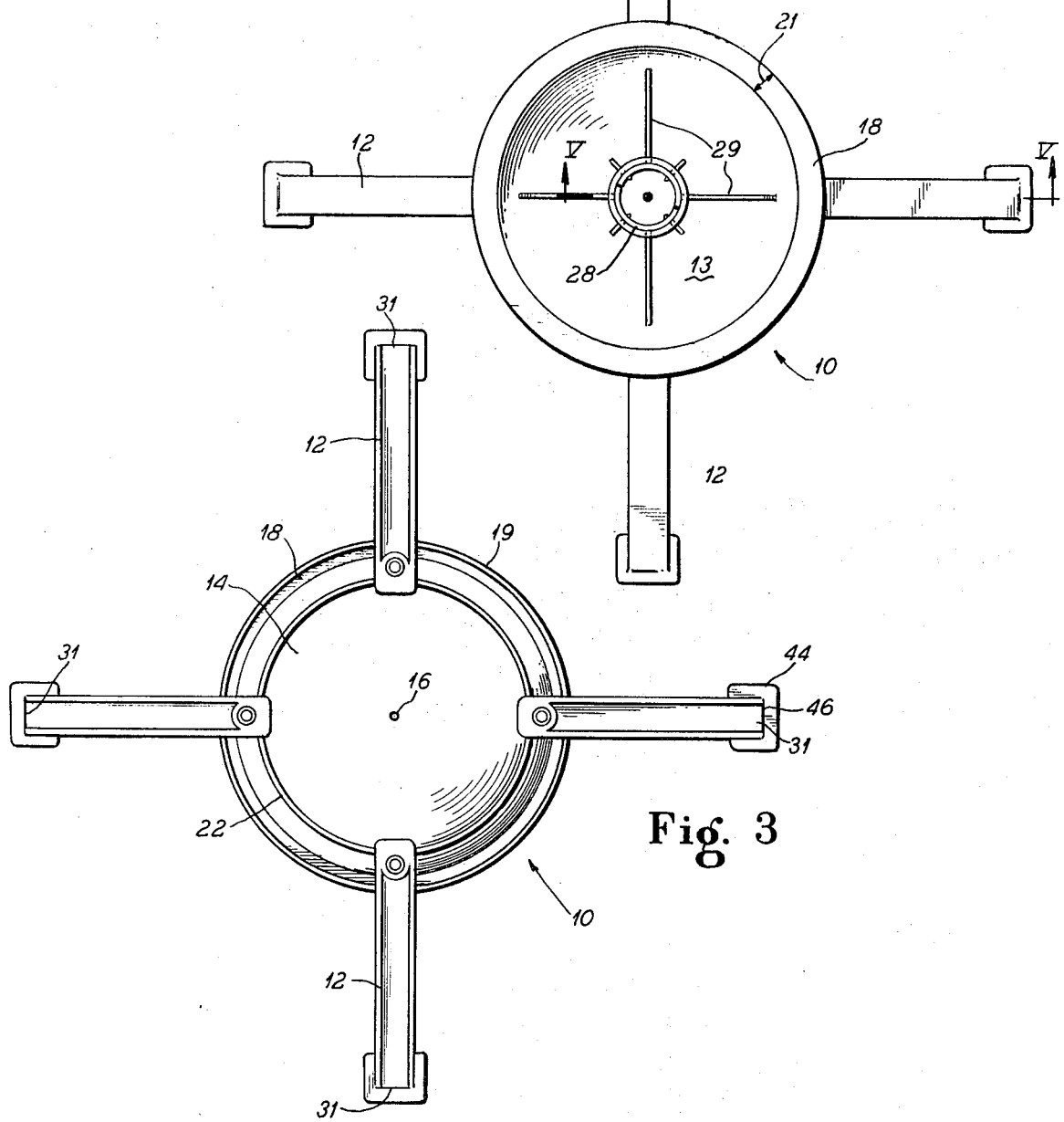
FIG. 1 is a perspective view of one embodiment of a stand of the present invention.
FIG. 2 is a top plan view of the stand of FIG. 1.
FIG. 3 is a bottom plan view of the stand of FIG. 1.

Referring to FIGS. 1 through 4, there is seen a preferred embodiment of a stand of this invention which is herein designated in its entirety by the numeral 10. Stand 10 is seen to incorporate a base panel 11 and a plurality of legs 12 demountably mountable on base panel 11. The base panel 11 has spaced, opposed upper and bottom faces 13 and 14, respectively, and base panel 11 has defined therein centrally a circular bowl shaped depression 15.

About the rim 17 of the depression 15 is a radially outwardly extending shoulder 18 which is integral with base panel 11. shoulder 18 terminates in a down-turned first flange 19. Shoulder 18 has a width 21 which is greater than the width of first flange 19.

A second flange 22 integrally downwardly depends from a mid-portion of the convex bottom surface or face 14 of the depression 15. The first flange 19 and the second flange 22 are generally in spaced, parallel relationship to the axis 23 of the depression 15 and, as illustrated in FIG. 3, are concentric circular flanges. The second flange 22 has a width which is greater than the width of the first flange 19.

In the embodiment 10, there are four generally hollow sections 26 which are integral with the concave bottom face of base panel 11 and downwardly depend therefrom. Each section 26 is open at its respective bottom end. Each hollow section 26 has its outer wall adjacent and integral with the radially outside face of second flange 22. Sections 26 are circumferentially spaced from one another and each has an axis 27 which is generally parallel to axis 23 of depression 15 in panel 11. Each hollow section 26 is preferably tubular as shown in stand 10 and all sections 26 preferably have substantially equal diameters, although any convenient cross-sectional shapes for hollow sections 26 may be used if desired.

A load bearable member 28 which is preferably hollow integrally upstands from the concave upper surface or face 13 of base panel 11 from the apex of depression 15 generally coaxially with the axis 23 thereof. Preferably, as shown in stand 10 the load bearable member comprises a generally tubular socket adapted for receipt therein of a Christmas tree base, or the like.

A plurality of rib members 29, one for each hollow tubular section 26, are provided. Each rib member 29 integrally upstands from face 13 and radially extends in circumferentially spaced relationship to the others thereof from the side wall of said load bearable member or tubular socket 28 to an adjacent portion of the concave upper face 13 of base panel 11. Each rib member 29 is generally longitudinally aligned with the axis 23 and radially aligned with the axis 27 of a different one of such hollow tubular sections 26. In the preferred embodiment shown, the radially outside tip of each rib member 29 terminates on face 13 about at the beginning of each hollow tubular section 26 on face 14 (see FIG. 5).

One leg 12 is provided for each hollow section 26, or four in all, for the embodiment 10 shown in the Figures. In an assembled configuration, each leg 12 laterally and radially outwardly extends from the base panel 11 and downwardly projects to an outside, surface engaging end 31. All ends 31 are adapted to rest on a common hypothetical first plane 30 which normally extends across axis 23 below the apex of the depression 15. Each leg 12 is demountable from engagement with the base panel 11 by moving each leg 12 in a direction parallel to the axis 23 downwardly relative to base panel 11.

The inner, upper end of each leg 12 adjacent panel 11 has a profile 32 which is adapted to make abutting face-to-face engagement, when in a mounted configuration on the lower face 14 of base panel 11, with portions of the convex bottom face 14 of bowl shaped depression 15 adjacent rim 17, as shown, and optionally with portions of the underside surface 14 of shoulder 18 at 32a and/or portions of the radially inside surface of the first flange 19 at 32b. Some combination of such engagements may be used, if desired.

The inner, lower end 33 of each leg 12 has a profile stub section 34 integrally formed therein. Each profile stub section 34 is adapted to make slidable, telescopic engagement within at least the bottom portion of one of such hollow sections 26 to a position when in a mounted configuration where the above-described abutting, face-to-face engagement exists at inner, upper end 32 of each leg 12. As shown in embodiment 10, each profile stub section 34 is preferably tubularly shaped in each leg 12. Also preferably, each hollow section 26 is generally co-terminous with the bottom edge 25 of the second flange 22.

Preferably in a stand 10, the width 24 of second flange 22 is substantially greater than the width of the first flange 19. Also preferably in a stand 10. The second flange 22 terminates, as respects its bottom edge 25, above the apex 16 of the bowl shaped depression 15. The stand 10 is preferably constructed so as to have the inner, lower end 33 of each leg 12 have an integral shoulder 36. Shoulder 36 radially inwardly extends horizontally from the inner, lower end 33 of each leg 12. Each shoulder 36 may be adapted to have its upper face abut or rest against the adjacent portions of bottom edge 25 of flange 22 which is, as shown, adjacent thereto when each leg is in a mounted, assembled configuration relative to the base panel 11.

Each leg 12 is preferably, as shown in stand 10, formed of a pair of spaced, parallel, upstanding side walls 37 and 38 which are continuously joined together across their respective top edge portions by a bridge member 39. To impart added flexural and structural rigidity to a leg 12, the lower, radially extending edge of each side wall 37 and 38 is preferably thickened circumferentially and such a thickening or ridge 41a and 41b on each side wall 37 and 38, respectively, joins shoulder 36. The thickening 41a and 41b are preferably on the circumferential, opposed, outside bottom edge of each respective side wall 37 and 38.

In embodiment 10, and preferably in a stand of this invention, the inner end of each leg 12 between the inner, upper end 32 and the inner, lower end 33 thereof is adapted to make abutting, face-to-face engagement with outside surface portions of each hollow tubular section 26 when a leg 12 is in a mounted configuration on base panel 11, so that such inner end in embodiment 10 has a curved surface whose axis is parallel to axis 23 and is coextensive with axis 27. Optionally, the lateral, inside edges of each side wall 37 and 38 may abut as shown in stand 10 against the adjacent surfaces of convex bottom face 14 of bowl shaped depression 15, and also against the radially outer surface of the second flange 22 (though in stand 10, these edges of walls 37 and 38 are spaced from flange 22).

Preferably, as in a stand 10, there depends from the inner, lower end 33 of each leg 12 a support peg 42 which is generally coaxial with the profile stub section 34 thereof. In stand 10, peg 42 is cylindrical and, in effect, is a downward extension of the tubular profile stub section 34. The exposed lower end of each such support peg 42 is adapted to rest on a common hypothetical second plane 40 which normally extends across axis 23 below the apex 16 but slightly above the first plane 30. The exposed ends 43 of all such support pegs 42 are further adapted to rest on such common hypothetical first plane 30 when the legs 12 are in a mounted configuration on the base panel 11 and the stand 10 is in an operative orientation with a load (not shown) applied to the load bearable member 28. Thus, as the stand 10 is pushed (depressed) by such applied load downwardly, a limited flexing action occurs, especially in the second flange 22, which permits the outisde end 31 of each leg 12 to move radially outwardly from axis 23 which, in effect, lowers the height of the rim 17 of bowl-shaped depression 15 to the position where the support pegs 42 have their exposed ends 43 brought down to first plane 30. In such a depression, the inner upper end of each leg 12 may shift slightly from face-to-face engagement with portions of the radially inside surface of the first flange 19 at 32b, to face-to-face engagement of upper end 32 with the lower face 14 of base panel 11 if a leg 12 is initially in such an engagement, as those skilled in the art will appreciate. At this point, the support pegs 42 provide additional load bearing capacity for stand 10 with the legs 12. This arrangement of elements permits a stand 10 when formed of plastic to bear and support surprisingly heavy loads applied to the load bearable member 28.

Preferably, and as shown in stand 10, the surface engaging end portion 31 of each leg 12 has a flattened surface engaging foot 44. Each foot 44 is integral with the end portion 31 of each leg 12 along a circumferentially extending, flexible joint region 46 therein. Thus, joint region 46 acts as the pintle portion of a hinge member when a leg 12 is formed of plastic or the like and constitutes a flexure location about which each foot 44 may pivot as a leg 12 rests upon a supporting surface and a load is applied to member 28. Thus, the foot 44 adapts each leg 12 to better distribute weight applied thereto in response to loads supplied to a load bearable member 28 when the legs 12 are in a mounted configuration on the base panel 11 and a stand 10 is in an operative orientation.

when the load member 28 is in the nature of a tubular socket as shown in stand 10, such tubular socket may have at least one longitudinal slot 47 (preferably a pair of diametrically opposed such slots 47) formed in the wall thereof to provide yielding, radial expansibility in such tubular socket relative to the axis 23 thereof. Also preferably, when such a load bearable member 28 is in the nature of a tubular socket, the inside walls of such socket may have formed therein at least one longitudinal ridge 48 preferably a pair of diametrically opposed ridges 48 to permit such a hollow socket member to better grasp the base end of a tree base, pole, or the like inserted thereinto for support. Preferably, there are two pairs of circumferentially spaced such ridges 48 formed on the inside walls of such a hollow socket member. When the load bearable member 28 is a tubular socket, such socket may be provided with a collar 49 which is adapted to circumferentially engage the upper end of such a tubular socket and thereby apply radially inwardly exerted pressure against the outside walls thereof towards axis 23. Optionally, such collar 49 is a tubular section of plastic or the like and optionally the collar 49 may have tapered inside wall surfaces which may facilitate engaging the inside wall surfaces of collar 49 with the outside wall surfaces of such a tubular socket.

While stand 10 has four legs, as described, those skilled in the art will appreciate that a stand of this invention may be fitted with only three legs, or, alternatively, may have more than four legs, such as five, six, or the like, but, in general, it is preferred to equip a stand 10 of this invention with four legs and the associated engaging elements therefor in and on a base panel 11.

Other and further embodiments and modifications within the spirit and scope of the present invention will be apparent to those skilled in the art from a reading of the present specification and drawings and no undue limitations are to be associated therewith.

I claim:

1. A stand for a load comprising:
a base panel being generally annularly-shaped about an axis having spaced, opposed upper and bottom faces, said panel having centrally defined therein a circular, bowl-shaped depression having a rim,
said base panel about the rim having an integral, radially outwardly extending shoulder,
said base panel having a circular flange integrally downwardly depending from the convex bottom face of said depression radially inward of said rim,
said base panel having at least three generally hollow sections circumferentially spaced on said flange and integral therewith, each of said hollow sections having a downward opening at their respective bottom ends and extending parallel to said axis,
said base portion having a load bearable member integrally upstanding from the concave upper face of said depression at the apex thereof and generally coaxial with said axis,
a leg for each of said hollow sections, each of the legs having a surface engaging end and an inner end having an upper portion and a lower portion,
said lower portions of the inner end of each leg having a profile stub section integrally formed therein, said stub section being adapted to make slidable, telescopic engagement within at least a bottom portion of one of said hollow sections to demountably mount the leg on the base panel,
the upper portion of the inner end of each leg having a profile which during telescopic engagement of the stub section in the hollow section, makes abutting, face-to-face engagement with portions of said convex bottom face adjacent said rim and portions of the underside surface of said shoulder,
and each of said legs having a configuration between the surface engaging end and the inner end so that during mounting of the leg with the upper portion in face-to-face engagement with portions of the base panel and the stub telescopically received in a hollow section, said leg extends radially outward and downwardly from the base panel with the surface engaging end adapted to rest on a common hypothetical first plane normally extending across said axis and below said apex.

2. A stand for a load comprising:
a base panel being generally annularly-shaped about an axis and having spaced, opposed upper and bottom faces, said base panel having centrally defined therein a circular, bowl-shaped depression having a rim,
said base panel about the rim having an integral, radially outwardly extending shoulder terminating in a down-turned first flange, said shoulder having a width greater than the width of said first flange,
said base panel having a second flange integrally downwardly depending from the convex bottom face of said depression in radially spaced relationship to the shoulder,
said first and second flanges being in generally spaced, parallel relationship to the axis of said panel and said second flange having a width greater than said width of said first flange,
said base panel having at least three generally hollow sections integrally downwardly depending from said convex bottom face and downwardly opening at their respective bottom ends, each section being outwardly adjacent and integral with said second flange, said sections being circumferentially spaced from one another and extending parallel to said axis, and
said base portion having a load bearable member integrally upstanding from the concave upper face of said depression at the apex thereof and generally coaxial with said axis, and
a leg for each of said hollow sections, each of the legs having a surface engaging end and an inner end having an upper portion and a lower portion,
said lower portion of the inner end of each leg having a profile stub section integrally formed therein, said stub section being adapted to make slidable, telescopic engagement within at least a bottom portion of one of said hollow sections to demountably mount the leg on the base panel,
the upper portion of the inner end of each leg having a profile which, during telescopic engagement of the stub section in the hollow section, makes abutting, face-to-face engagement with portions of said convex bottom face adjacent said rim, portions of the underside surface of said shoulder, and portions of the radial inside surface of said first flange;
and each of said legs having a configuration between the surface engaging end and the inner end so that during mounting of the leg with the upper portion in face-to-face engagement with portions of the base panel and the stub telescopically received in a hollow section, said leg extends radially outwardly and downwardly from the base panel with the surface engaging end adapted to rest on a common hypothetical first plane normally extending across said axis and below said apex.

3. A stand of claim 2 further including a first plurality of rib members, one for each said hollow section, each such rib integrally upstanding and radially extending in circumferentially spaced relationship to the others thereof from said load bearable member to an adjacent portion of said concave upper face being generally radially aligned with a portion of a different one of such hollow sections.

4. A stand of claim 3 further having a second plurality of rib members, each one integrally upstanding and radially extending midway circumferentially between each pair of rib members in said first plurality thereof and radially between said load bearable member and an adjacent portion of said concave upper face, the vertical height along said axis of rib members in said second plurality thereof being less than that of said first plurality thereof.

5. A stand of claim 2 wherein said width of said second flange is substantially greater than said width of said first flange.

6. A stand of claim 2 wherein said second flange terminates above said apex.

7. A stand of claim 2 wherein such hollow sections are tubular and have substantially equal diameters.

8. A stand of claim 7 wherein said profile stub section is tubular in each leg.

9. A stand of claim 2 wherein said hollow sections are each generally co-terminous with the bottom of said second flange.

10. A stand of claim 2 wherein the lower portion of the inner end of each leg has an integral shoulder radially inwardly extending horizontally therefrom for abutting against portions of the bottom of said second flange as the leg is mounted on said base panel.

11. A stand of claim 2 wherein the inner end of each leg has a profile surface for making abutting face-to-face engagement with outside wall portions of the adjacent hollow sections.

12. A stand of claim 2 wherein the lower portion of said inner end of each leg has a depending support peg which is generally coaxial with said profile stub section thereof, the exposed ends of all such support pegs being adapted to rest on a common hypothetical second plane normally extending across said axis below said apex but slightly above said first plane, said exposed ends of all such support pegs being further adapted to rest on said common hypothetical first plane when said legs are in said mounted configuration and said stand is in an operative orientation with a load applied to said load bearable member so that said support pegs are adapted to provide additional load bearing capacity with said legs.

13. A stand of claim 2 wherein said load bearable member comprises a generally tubular socket adapted for receipt therein of Christmas tree base or the like.

14. A stand of claim 13 wherein said tubular socket has at least one longitudinally extending ridge in the inside wall thereof.

15. A stand of claim 13 wherein said tubular socket has at least one longitudinally extending slot in the wall thereof to provide yielding radial expansibility relative to the axis thereof.

16. A stand of claim 15 wherein collar means is provided which is adapted to circumferentially engage the upper end of said socket and apply radially inwardly exerted pressure against the outside walls thereof.

17. A stand of claim 16 wherein said collar means is tubular and has tapered inside wall surfaces.

18. A stand of claim 2 wherein the surface engaging end of each one of said legs has a flattened, surface engaging foot portion, said foot portion being integral with said surface engaging end along a circumferentially extending, axially flexible joint region therein, thereby adapting said foot portions to distribute weight applied thereto in response to loads applied to said load bearable member when said legs are in said mounted configuration and said stand is in an operative orientation.

19. A stand of claim 2 wherein there are four of said hollow sections and four of said legs.

20. A stand of claim 2 wherein each leg comprises a pair of spaced parallel side wall portions continuously integrally interconnected across their respective top edge portions by a bridge member.

21. A stand of claim 20 wherein each side wall portion has a circumferentially outwardly protruding radially extending ridge along its respective bottom edge portions.

22. A stand of claim 21 wherein each such ridge interconnects with a horizontal, radially inwardly extending integral shoulder on the lower portion of the inner end of each leg which shoulder abuts against portions of the bottom of said second flange when the leg is in said mounted configuration.

23. A stand of claim 20 wherein said side wall portions are interconnected together at their inner respective ends by an arcuate surface which is adapted to make abutting, face-to-face engagement with radial outside surface portions of said hollow section adjacent thereto in an assembled said stand.

24. A stand of claim 23, wherein the arcuate surface has a contour to enable the inner ends of the side wall portions to abut the second flange as the leg is mounted on the base panel.

* * * * *